(12) United States Patent
Jones et al.

(10) Patent No.: US 7,771,500 B2
(45) Date of Patent: Aug. 10, 2010

(54) TRANSIT BUS INTAKE AIR MANAGEMENT BOX

(75) Inventors: Robert J. Jones, Yoder, IN (US); Eric W. Maxwell, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 324 days.

(21) Appl. No.: 12/054,551

(22) Filed: Mar. 25, 2008

(65) Prior Publication Data

US 2009/0241887 A1 Oct. 1, 2009

(51) Int. Cl.
*B01D 45/08* (2006.01)
(52) U.S. Cl. ........................ 55/462; 55/385.3; 55/465; 95/267; 123/184.47
(58) Field of Classification Search .................... 55/462, 55/385.3, 465; 95/267; 123/184.23
See application file for complete search history.

(56) References Cited

U.S. PATENT DOCUMENTS

| | | | | |
|---|---|---|---|---|
| 3,254,475 A | * | 6/1966 | Farr et al. | 96/232 |
| 3,406,423 A | * | 10/1968 | Young | 15/347 |
| 5,912,368 A | * | 6/1999 | Satarino et al. | 55/320 |
| 6,860,915 B2 | * | 3/2005 | Stegmaier et al. | 55/337 |
| 2004/0040269 A1 | * | 3/2004 | Gieseke et al. | 55/330 |
| 2006/0230714 A1 | * | 10/2006 | Oh et al. | 55/319 |
| 2007/0175186 A1 | * | 8/2007 | Braziunas | 55/385.3 |
| 2007/0234903 A1 | * | 10/2007 | Xu et al. | 95/267 |
| 2008/0110098 A1 | * | 5/2008 | Frederick | 49/463 |

FOREIGN PATENT DOCUMENTS

JP 61271121 A * 12/1986

* cited by examiner

*Primary Examiner*—Jason M Greene
*Assistant Examiner*—Dung Bui
(74) *Attorney, Agent, or Firm*—Jeffrey P. Calfa; Mark C. Bach

(57) ABSTRACT

An intake air management apparatus attached to a vehicle frame and configured for connection to an air cleaner of a vehicle includes a box having an opening defined by a pair of opposing sidewalls, a back wall, a top surface and a bottom surface having an aperture. An air drop tube is inserted into the aperture and has an inlet end and an oppositely located outlet end. A diversion baffle partially covers the opening and is configured for preventing moisture from entering the inlet end of the tube.

16 Claims, 3 Drawing Sheets

TRANSIT BUS INTAKE AIR MANAGEMENT BOX

FIELD OF THE INVENTION

The present invention relates generally to air intake systems for engines, and more particularly, to an engine air induction system for front-engine transit buses and similar vehicle configurations requiring remote engine air intake systems.

BACKGROUND OF THE INVENTION

Front-engine transit bus vehicles are known in the commercial vehicle art. Such vehicles typically have low elevation bodies with the engine and transmission located under the driver and passenger platform, and as a result, present difficulties for engine combustion fresh air induction. Due to the lower vehicle platform elevation and positioning of the driver's platform, cooling module, and passenger entry doors above and around the engine location, it is difficult to access and provide engine fresh air induction. Further, such low elevation and positioning render it difficult to provide the engine with induction air that is not preheated by powertrain heat rejection or that is not susceptible to entrained or directly ingested water.

Current front-engine transit bus air induction systems typically ingest air from beneath the platform. This under-platform air is generally protected from water ingestion but is substantially preheated by heat emanating from the engine and vehicle cooling module. Ingesting such preheated air into the engine air induction system increases turbocharger air inlet temperatures. These high turbo inlet air temperatures can prevent the engine from meeting the engine manufacturer's installation requirements and can prevent the engine installation from qualifying under Environmental Protection Agency (EPA) requirements. These EPA requirements, among other things, control the amount of emissions produced by the engine, and the engine installations in most front-engine buses and other highway vehicles are required to meet these standards.

To attempt to overcome this problem, air intake systems were developed and generally included a "J-shaped" tube that was attached to the vehicle underbody at the engine air cleaner, which feeds the engine via the turbo inlet. Air enters the tube, filters through the air cleaner, and passes into the turbo inlet of the engine. The inlet end of the J-tube is typically defined at a top surface of the tube to prevent water or moisture from entering the tube and damaging the engine.

However, because these previous systems do not provide an interface to external air, they induct overheated under-platform air into the air cleaner. As indicated above, such high temperature intake air can prevent the engine from meeting the manufacturer's installation requirements, thereby preventing the engine installation from complying with EPA emissions requirements.

Front engine bus chassis are typically built as drivable chassis and taken to a separate body plant for body installation or sold as drivable chassis to independent body builders. Accordingly, bus chassis manufacturers wish to manufacture the induction system on the plant's chassis production line, enabling delivery of completed and drivable chassis having a validated engine air intake system to second-party vehicle body builders, ensuring that the engine installation meets the required standards.

SUMMARY OF THE INVENTION

An intake air management apparatus is attached to a vehicle frame and configured for connection to an air cleaner. The apparatus includes a box having an opening defined by a pair of opposing sidewalls, a back wall, a top surface and a bottom surface having an aperture. An air drop tube is inserted into the aperture and has an inlet end and an oppositely located outlet end. An air diversion baffle partially covers the opening and is configured for preventing moisture from entering the inlet end of the tube.

DESCRIPTION OF A PREFERRED EMBODIMENT

Figure 1:
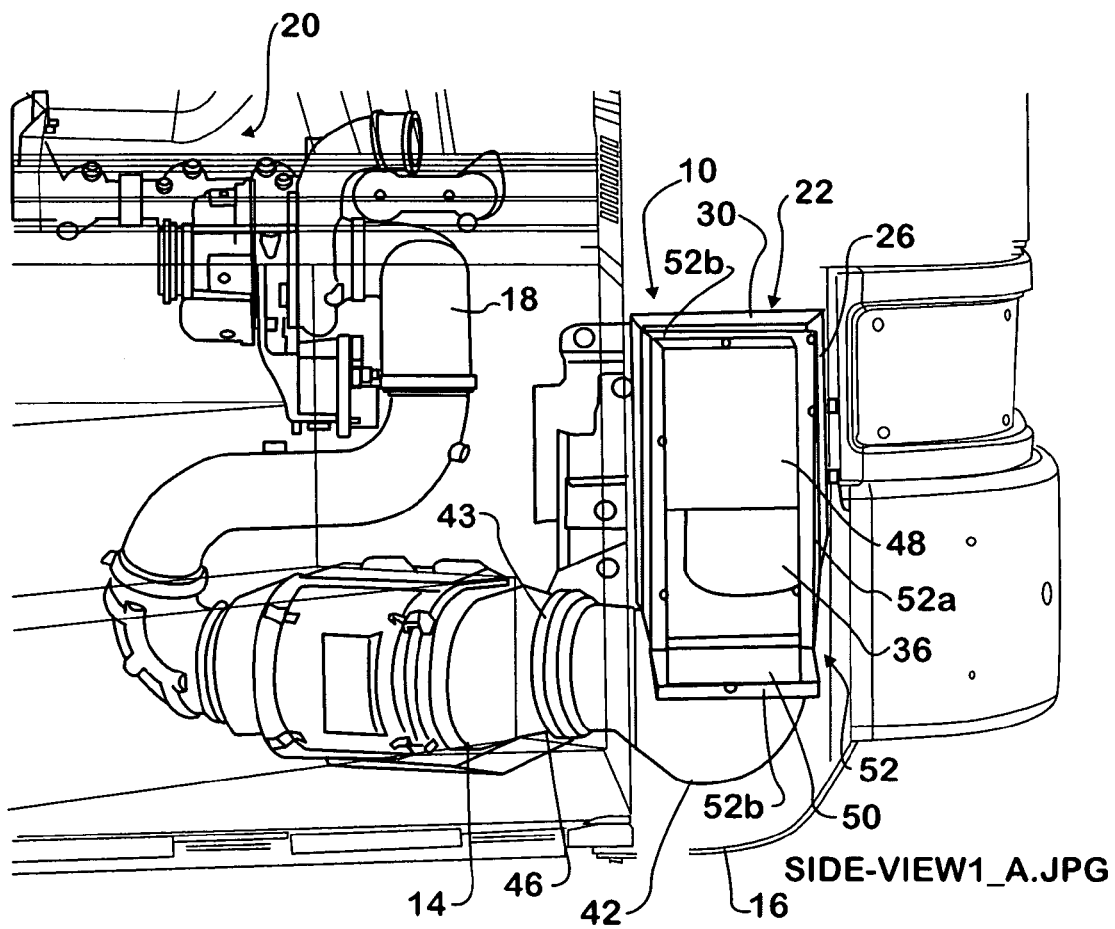
FIG. 1 is a side view of the intake air management apparatus mounted on a vehicle chassis in accordance with the invention.
Figure 2:
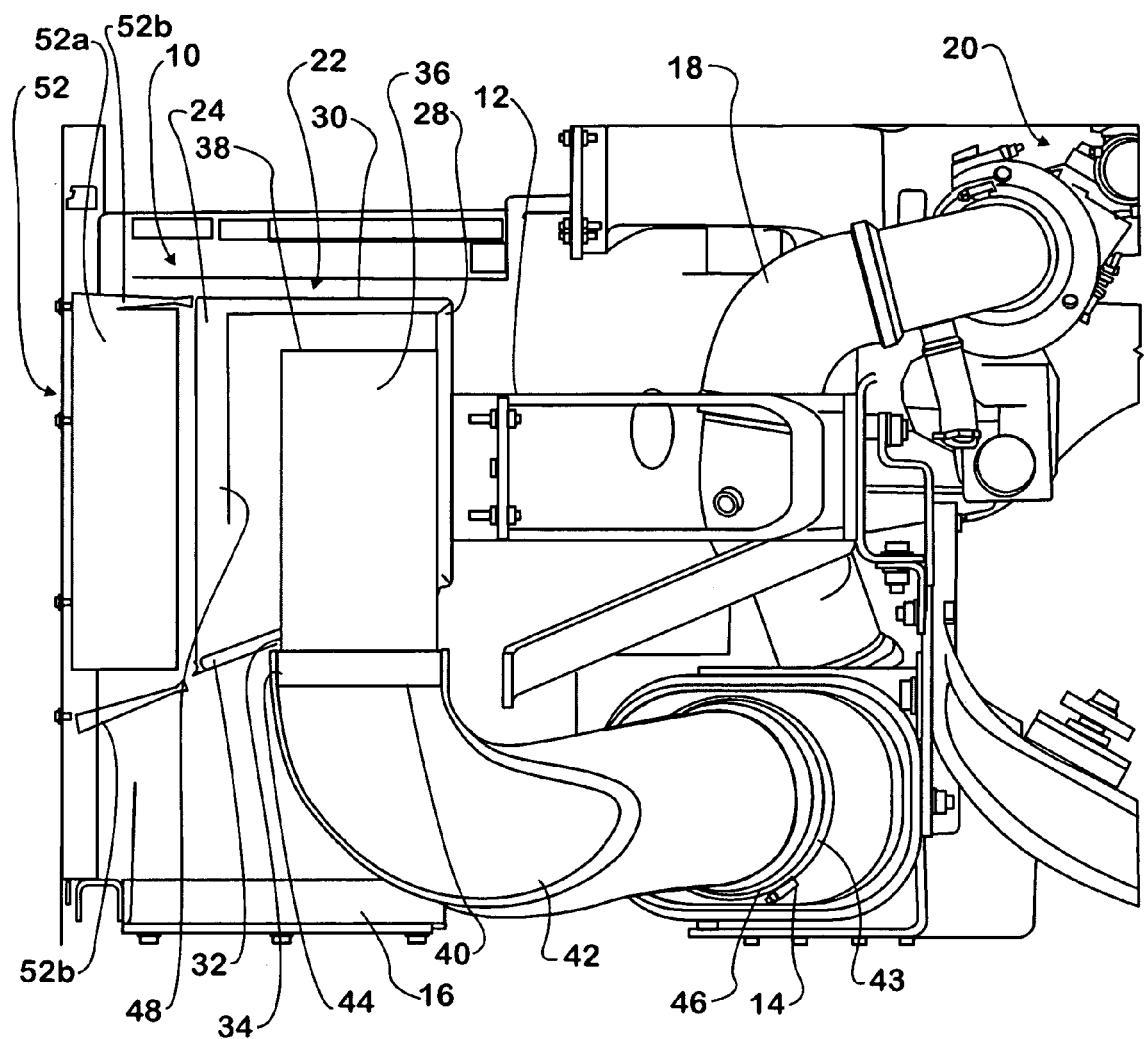
FIG. 2 is a side section view of the intake air management apparatus attached to an engine air cleaner in accordance with the invention.
Figure 3:
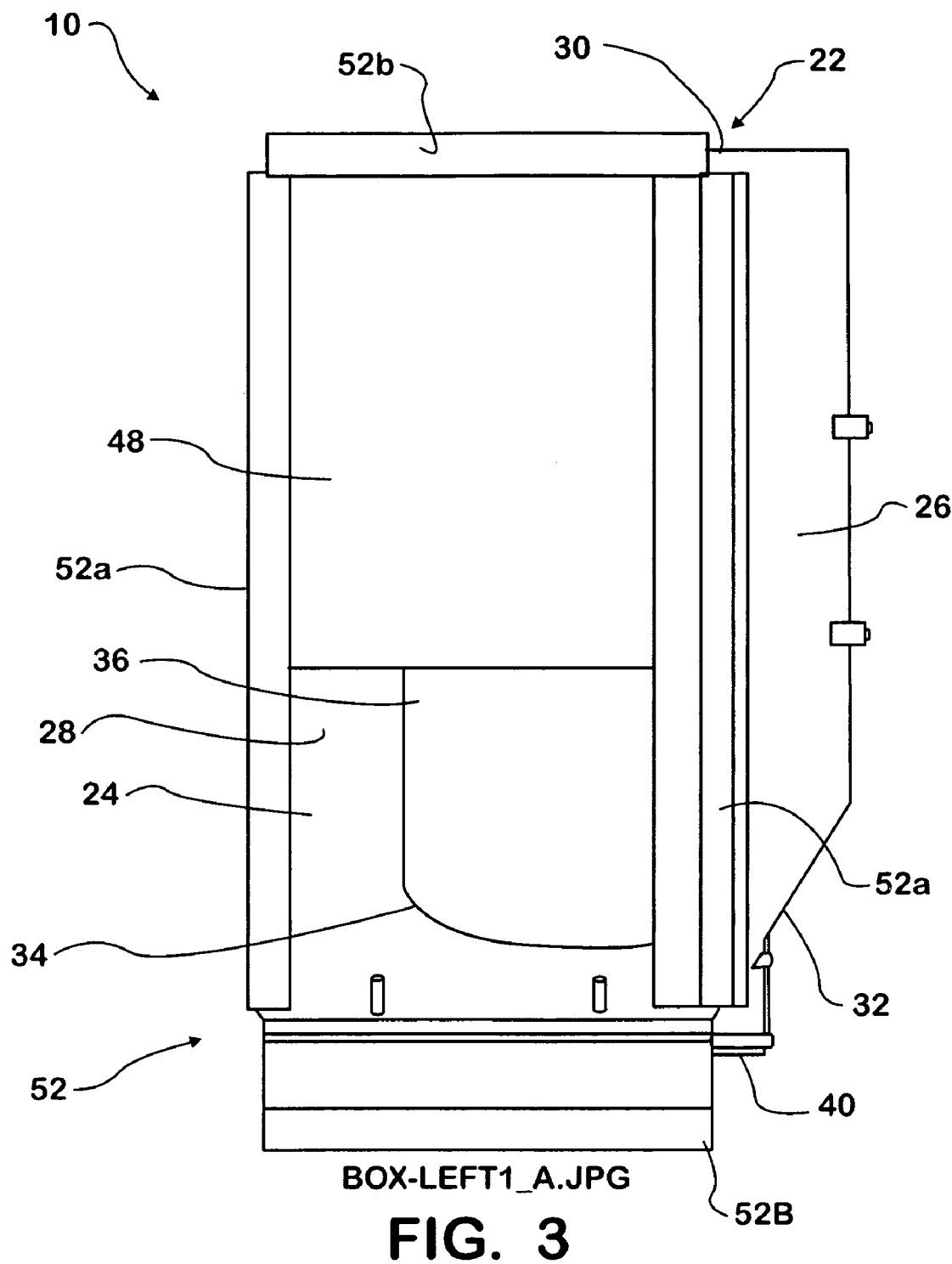
FIG. 3 is a side perspective view of the intake air management apparatus in accordance with the invention.

Referring to FIGS. 1-3, an intake air management apparatus for use with a front-engine bus or commercial vehicle is generally designated 10. The apparatus 10 is attached to a vehicle frame 12 and is configured for connection to an air cleaner 14 of a vehicle 16. As known in the art, the air cleaner 14 feeds a turbo inlet 18 of an engine 20 and filters air entering the cleaner prior to its passage into the turbo inlet.

The apparatus 10 includes a box 22 having an opening 24 defined by a pair of opposing sidewalls 26, a back wall 28, a top surface 30 and a bottom surface 32 having an aperture 34. The box 22 is favorably manufactured of steel and coated with a corrosion-resistant paint, as known in the art, although other anti-corrosive materials with similar properties may be suitable. As seen in FIG. 1, the opposing sidewalls 26 are arranged substantially opposite to each other, although it is recognized that other configurations may be suitable, depending on the application. The box 22 has a larger volume than the J-tube typically used in current intake systems, and accordingly provides more efficient air velocity reduction to separate water or moisture and prevent it from entering the aperture 34.

An air drop tube 36 is inserted into the aperture 34 and has an inlet end 38 and an oppositely located outlet end 40. The aperture 34 is advantageously circular and is sized to receive the cylindrical drop tube 36, although other shapes or dimensions for the aperture and tube may be appropriate. As seen in FIG. 2, the air drop tube 36 is arranged substantially parallel to the back wall 28. The inlet end 38 is substantially parallel to the top surface 30 and is constructed and arranged for receiving fresh external air, and the outlet end 40 is configured for passing the air to the air cleaner 14.

To facilitate such air transfer, the apparatus 10 is coupled to a hose member 42 having a first end 44 attached to the drop tube outlet end 40 and an opposite end 46 connected to the vehicle air cleaner 14. The hose member 42 is coupled to the drop tube outlet end 40 and the air cleaner 14 by hose clamps 43, although other similar clamping mechanisms may be appropriate. The hose member 42 is manufactured of a flexible, corrosion-resistant rubber, although other similar materials may be suitable.

The hose member 42 enables the apparatus 10 to be located a distance away from and indirectly attached to the air cleaner 14, in contrast to current intake systems that are directly connected to the air cleaner. Accordingly and as seen in FIG. 1, the apparatus 10 is attached to the vehicle frame 12 such that the intake air management box 22 ingests cool outside air, rather than the higher temperature underbody air ingested by current intake systems.

Specifically, it has been found that current intake systems result in turbocharger inlet air temperatures of approximately 70° F. above ambient, which renders the engine non-compliant with the typical installation requirements of engine manufacturers of front-engine buses, jeopardizing the capability of the installations to comply with EPA vehicle exhaust emission requirements. However, with the current apparatus 10, turbocharger inlet air temperatures are approximately 28° F. above ambient, which is under the typical bus engine manufacturer's installation guidelines specifying a maximum turbo inlet air temperature of 30° F. above ambient, such as the MaxxForce DT engine manufactured by International Truck and Engine of Warrenville, Ill. Advantageously, the apparatus 10 is provided adjacent to and within a vehicle grille (not shown), such that fresh outside air passing through the grille will enter the box opening 24.

In contrast to current intake systems, the apparatus 10 is constructed and arranged for preventing water or other moisture from entering the air drop tube 36. To prevent moisture from entering the tube 36, the intake air management apparatus 10 includes a diversion baffle 48 overlapping the drop tube inlet end 38. As seen in FIG. 2, the diversion baffle 48 is advantageously spaced a distance away from the drop tube 36 to enable air to enter the inlet end 38 from any direction within the opening 24, and is arranged substantially parallel to the back wall 28 and planar with the opening.

The diversion baffle 48 is advantageously a solid panel extending from the top surface 30 past the tube inlet end 38, thereby preventing water or other moisture from entering the tube 36. It is contemplated that the parallel relationship between the inlet end 38 and the top surface 30 further prevents moisture from entering the tube 36 because it provides sufficient overlap between the diversion baffle 48 and the inlet end.

To provide additional protection from intrusion of water and debris, the exterior skin of the vehicle 16 is equipped with a perforated screen member 50. By equipping the vehicle with the perforated screen member 50, the diversion baffle 48 provides a secondary barrier such that moisture passing through the member 50 will be blocked by the diversion baffle 48 and prevented from entering the drop tube 36 and eventually, the engine 20. In instances where moisture does pass through the perforated screen member 50 and enters the opening 24, the box bottom surface 32 is favorably arranged obliquely relative to the back wall 28 for enabling the moisture to drain from the box 22.

The apparatus 10 additionally includes at least one pair of seal extensions 52 attached to the box 22 and configured for providing a compliant seal between the apparatus and the exterior surface of the vehicle 16 and for enabling moisture drainage. The seal extensions 52 compensate for variations in the relative position between the air management box 10 and the vehicle surface while also providing a compliant interface that permits a complete vehicle body to be lowered onto a complete running chassis consistent with industry practice.

Favorably, the apparatus 10 includes a first pair of extensions 52a each attached to a corresponding one of the sidewalls 26, and a second pair of extensions 52b each attached to one of the top or bottom surfaces 30, 32, as shown in FIGS. 1 and 3. Each member of the first pair of extensions 52a is advantageously arranged generally planar to the corresponding sidewalls 26, and each member of the second pair of extensions 52b is arranged generally planar to the top and bottom surfaces 30, 32, respectively.

The first and second pairs of extensions 52a, 52b surround the opening 24 and are constructed and arranged for providing a compliant seal between the apparatus 10 and the skirt of the vehicle 16. Specifically, the compliant seal extensions 52 couple the intake air management box 22 to the exterior surface of the vehicle body 12, and also couple the box to the perforated screen 50 to prevent moisture from entering the box. To enable moisture to exit the box 22, the first and second pairs of extensions 52a, 52b are advantageously nylon brush hairs constructed and arranged substantially parallel to each other, although other components for the extensions with similar properties are contemplated. The brush seal extensions 52a, 52b are advantageous over steel or other rigid materials because they form a seal that prevents abrasion between the skirt of the vehicle 16 and the box 22. The seal also prevents moisture or dirt from becoming stuck between the vehicle 16 and the box 22, which could lead to corrosion of the seal. Further, because the brush seal extensions 52a, 52b are flexible and provide spacing between each individual hair, moisture that does enter the box opening 24 can drain from the box.

The present apparatus 10 provides fresh external air to the engine 20, enabling the turbo inlet air temperature to meet the engine manufacturer's installation requirements, thereby allowing the engine installation to meet EPA emission requirements. The apparatus 10 is indirectly attached to the turbo inlet 18, and accordingly can be located on the vehicle frame 12 such that it ingests fresh outside air. The apparatus 10 further provides several countermeasures against water/moisture, including the diversion baffle 48, the brush seal extensions 52a, 52b, and the obliquely sloped bottom surface 32. In addition, the extensions 52a, 52b provide a compliant seal between the skirt of the vehicle 16 and the box 22, preventing abrasion between the box and vehicle, and also preventing moisture or dirt from corroding the seal.

The present intake air management apparatus may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An intake air management apparatus attached to a vehicle frame and configured for connection to an air cleaner of a vehicle, comprising:

a box including an opening defined by a pair of opposing sidewalls, a back wall, a top surface and a bottom surface having an aperture;

an air drop tube inserted into said aperture and having an inlet end and an oppositely located outlet end; at least one pair of extensions attached to said box and configured for providing a seal between the apparatus and a body, wherein said at least one pair of extensions is a first pair of extension attached to said sidewalls and arranged generally planar thereto, and a second pair of extensions attached to said top and bottom surfaces and arranged generally planar thereto; and a screen air diversion baffle at least partially covering said opening and configured for preventing moisture from entering said inlet end of said tube.

2. The apparatus of claim 1 wherein said first and second pairs of extensions surround said opening.

3. The apparatus of claim 1 wherein said first and second pairs of extensions are brush seals constructed and arranged for enabling moisture to exit said box.

4. The apparatus of claim 1 further including a hose member having a first end connected to said outlet end of said air drop tube and an opposite end connected to the vehicle air cleaner.

5. The apparatus of claim 1 wherein said bottom surface is arranged obliquely relative to said back wall for enabling moisture drainage from said box.

6. The apparatus of claim 1 wherein said air drop tube is arranged substantially parallel to said back wall.

7. The apparatus of claim 1 wherein said screen is a solid baffle extending from said top surface past said inlet end of said air drop tube.

8. An intake air management apparatus attached to a vehicle frame and configured for connection to an air cleaner of a vehicle, comprising:

a box including an opening defined by a pair of opposing sidewalls, a back wall, a top surface and a bottom surface having an aperture, said bottom surface being arranged obliquely relative to said back wall for enabling moisture to exit said box;

an air drop tube provided over said aperture and having an inlet end and an oppositely located outlet end; and at least one pair of extensions attached to said box and configured for providing a seal between the apparatus and the frame.

9. The apparatus of claim 8 further including at least one screen at least partially covering said opening and configured for preventing moisture from entering said inlet end of said tube.

10. The apparatus of claim 9 wherein said at least one screen is a solid barrier extending from said top surface past said inlet end of said tube.

11. The apparatus of claim 8 wherein said at least one pair of extensions is a first pair of extensions attached to said sidewalls and arranged generally planar thereto, and a second pair of extensions attached to said top and bottom surfaces and arranged generally planar thereto.

12. The apparatus of claim 11 wherein said first and second pairs of extensions are brush seals constructed and arranged for surrounding said opening.

13. The apparatus of claim 8 further including a hose member having a first end connected to said outlet end of said air drop tube and an opposite end connected to the vehicle air cleaner.

14. An intake air management apparatus attached to a vehicle frame and configured for connection to an air cleaner of a vehicle, comprising:

a box including an opening defined by a pair of opposing sidewalls, a back wall, a top surface and a bottom surface having an aperture, said bottom surface being arranged obliquely relative to said back wall for enabling moisture to exit said box;

an air drop tube provided over said aperture and having an inlet end and an outlet end;

a solid barrier extending from said top surface past said inlet end of said tube;

a first pair of extensions attached to said sidewalls and arranged generally planar thereto; and a second pair of extensions attached to said top and bottom surfaces and arranged generally planar thereto.

15. The apparatus of claim 14 wherein said first and second pairs of extensions are brush seals constructed and arranged for surrounding said opening and providing a seal between said box and the vehicle.

16. The apparatus of claim 14 further including a hose having a first end connected to said outlet end of said tube, and an opposite end connected to the air cleaner.

* * * * *